C. P. A. FRIBERG.
CULTIVATOR.
APPLICATION FILED JAN. 2, 1908.
1,215,642.
Patented Feb. 13, 1917.
4 SHEETS—SHEET 1.
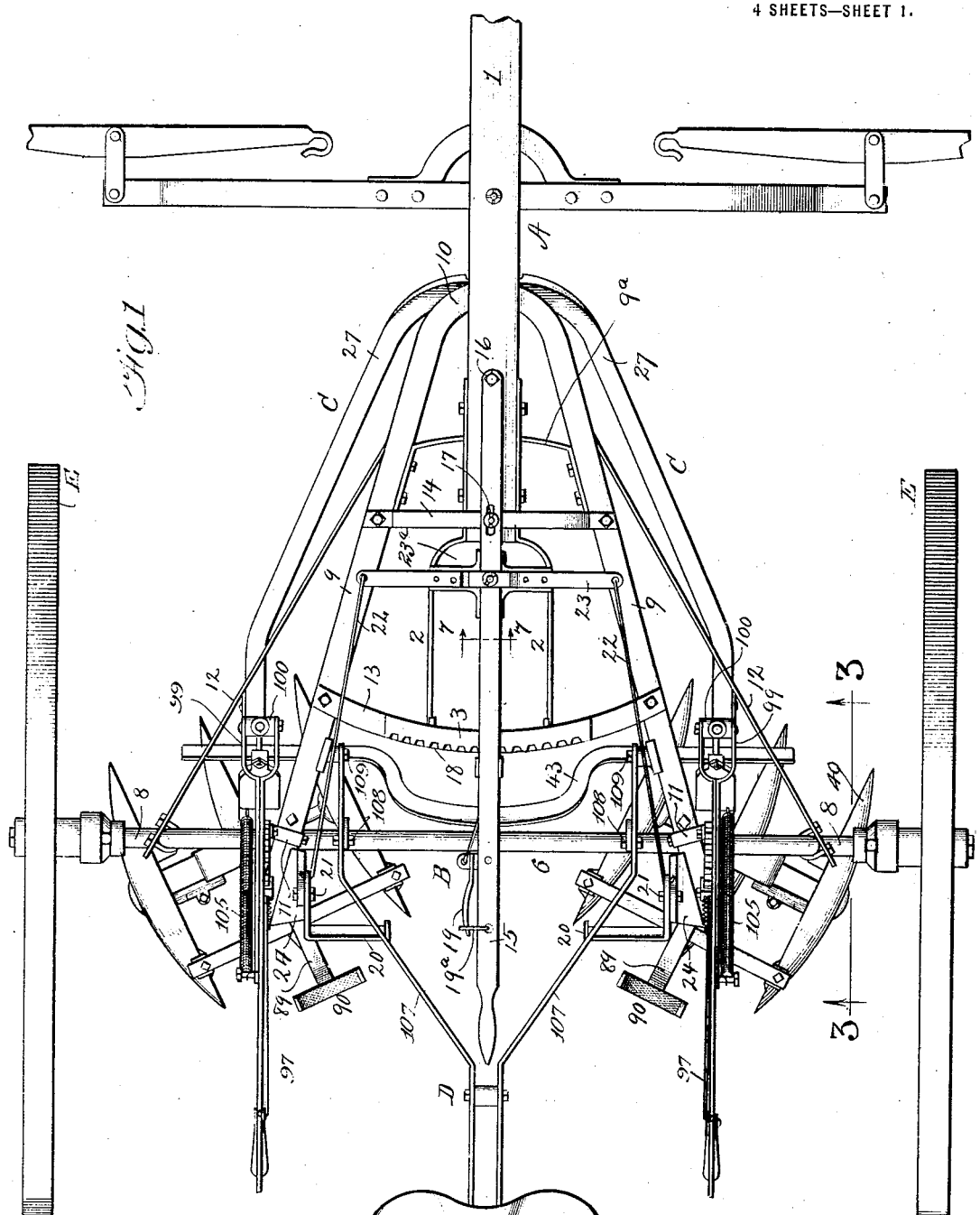

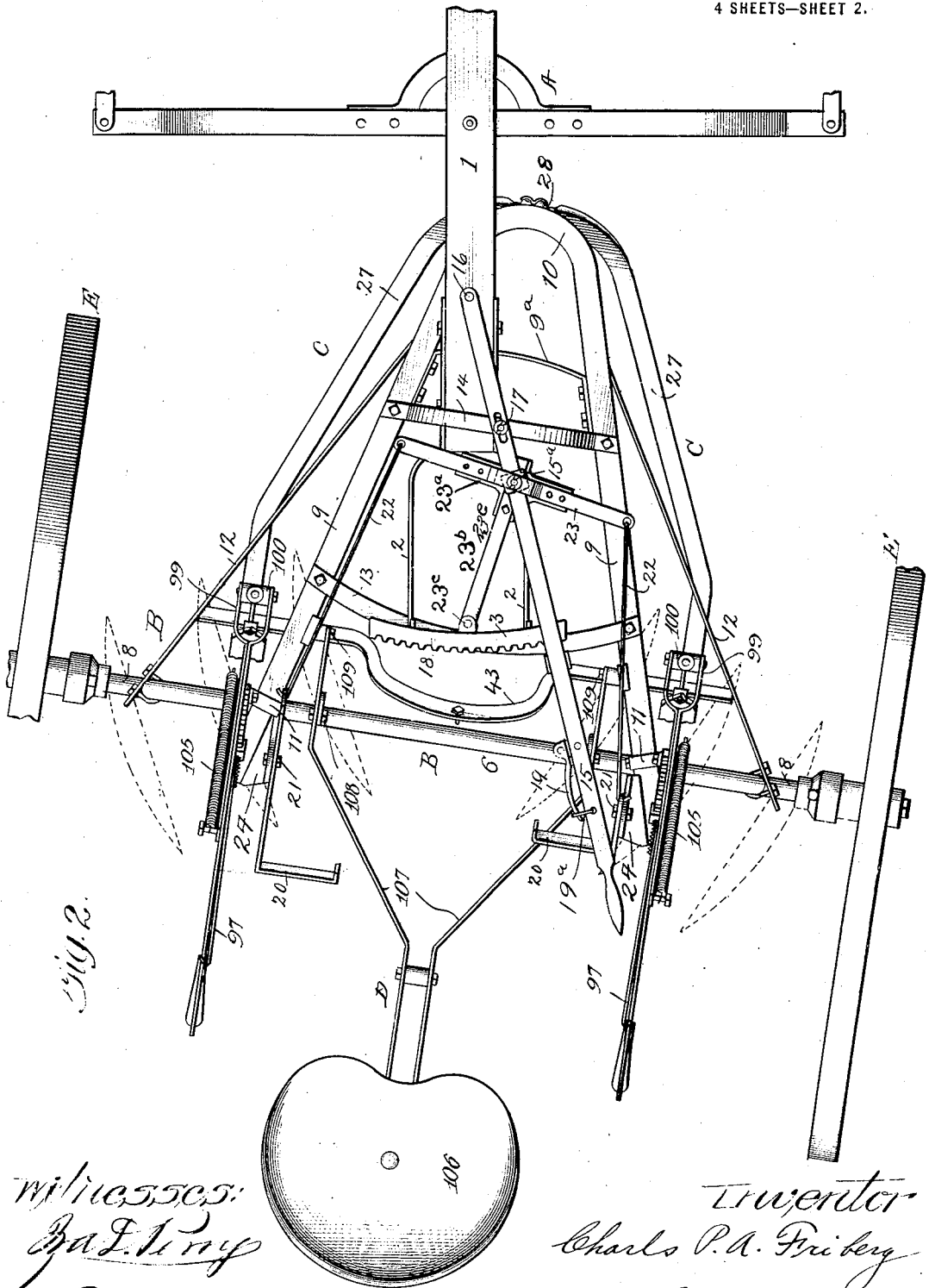

C. P. A. FRIBERG.
CULTIVATOR.
APPLICATION FILED JAN. 2, 1908.
1,215,642.
Patented Feb. 13, 1917.
4 SHEETS—SHEET 3.
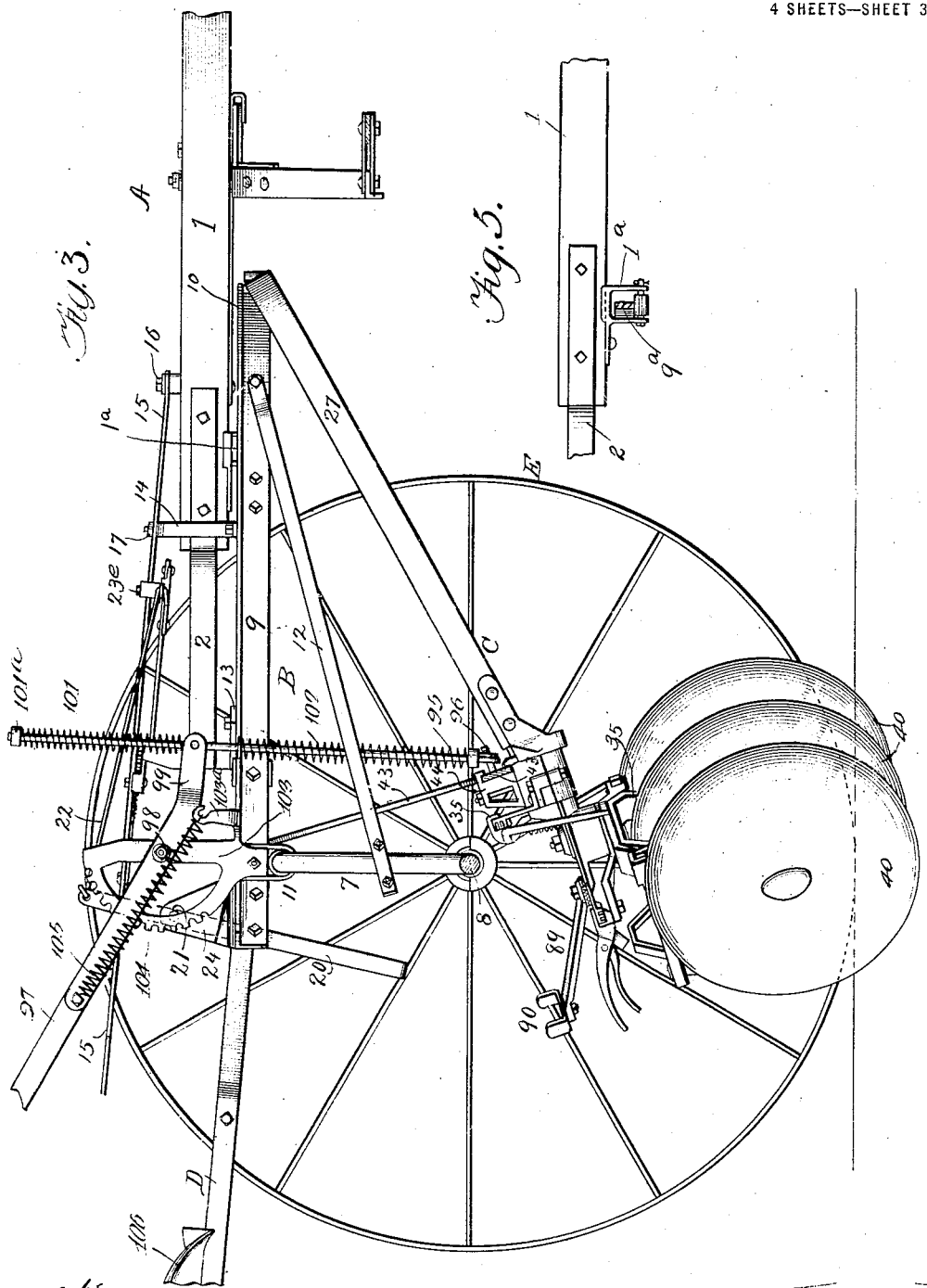

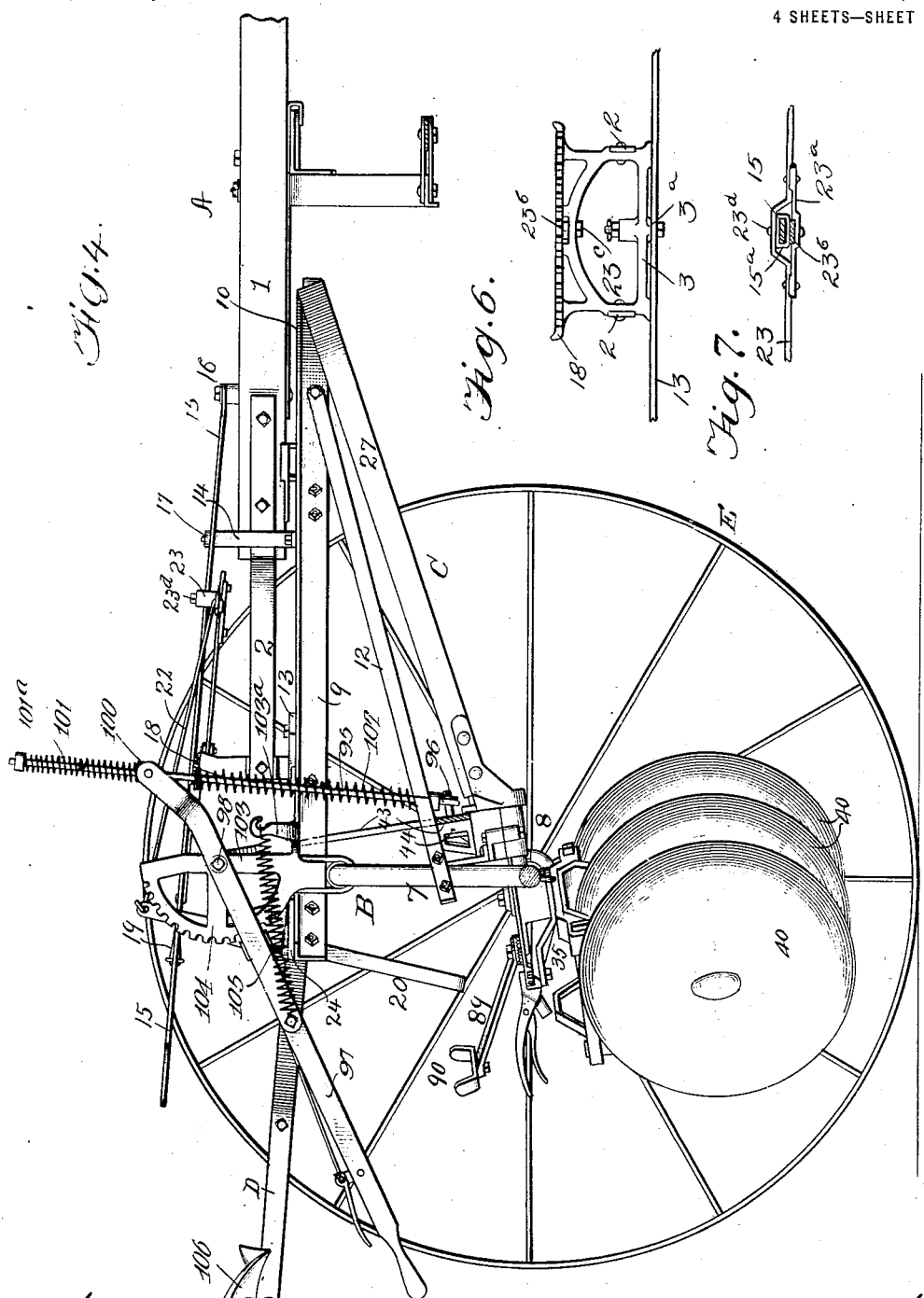

UNITED STATES PATENT OFFICE.

CHARLS P. A. FRIBERG, OF MOLINE, ILLINOIS, ASSIGNOR TO DEERE & MANSUR COMPANY, OF MOLINE, ILLINOIS, A CORPORATION OF ILLINOIS.

CULTIVATOR.

1,215,642. Specification of Letters Patent. Patented Feb. 13, 1917.

Application filed January 2, 1908. Serial No. 409,034.

*To all whom it may concern:*

Be it known that I, CHARLS P. A. FRIBERG, citizen of the United States, residing at Moline, in the county of Rock Island and State of Illinois, have invented certain new and useful Improvements in Cultivators, of which the following is a specification, reference being had therein to the accompanying drawing.

This invention relates to improvements in cultivators, they pertaining more particularly to cultivators of the straddle-row class. In many respects the improvements here presented are well adapted for use in cultivators having disks for working the soil, but it is to be understood that many of the structural matters presented are capable of use in machines having other working tools.

Figure 1 is a top plan view of a cultivator embodying my improvements with the parts shown in their central positions.

Fig. 2 is a top plan view showing principally the frames when they are adjusted laterally in one direction or the other.

Fig. 3 is a side elevation of the machine, the axle being shown in section on the line 3, 3 of Fig. 1 and one of the ground wheels being removed.

Fig. 4 is a side elevation similar to that of Fig. 3, except that the cultivator gangs are shown in their elevated positions.

Fig. 5 is a fragmentary side elevation showing details of construction.

Fig. 6 is a fragmentary rear elevation showing certain other details of the construction.

Fig. 7 is a fragmentary sectional elevation, the section being taken on the line 7 7 in Fig. 1.

The implement as a whole may be understood as comprising the draft frame at A, the wheel frame B, and the frame or frames at C for supporting and propelling the disk gangs.

The frame A comprises the tongue or pole 1 which at the rear has the bars or arms 2 extending backward therefrom and secured at their ends to the frame-like casting 3, which is pivotally secured at 3ª to a cross bar 13 which is rigid with the wheel frame Fig. 6.

The frame B is mounted upon the supporting wheels E, E, and comprises the axle having the relatively elevated central part 6, the downwardly extending leg parts 7 and the outwardly turned spindle portions 8 upon which the wheels E are mounted. This crank axle is held in an upright position by the supplemental parts attached to it. There is an angle frame having the side bars 9, 9, connected by the curved part 10 at the front and having their rear ends rigidly secured to the axle bar 6 by the clips or brackets at 11. This frame 9, 10, is braced to the axle by means of the braces 12 which are secured to the vertical legs 7 at their rear ends and to the horizontal bars 9 at their front ends. 13 is a curved brace bar connecting the side bars 9, 9 of the frame and 14 is a bar also extending from one of these bars 9 to the other and rigidly secured to both, it being situated near the front end of the wheel frame. This bar is elevated at the central part so as to extend over or straddle across the tongue 1.

15 is a lever extending from points where it can be accessible at the rear of the machine forward to the tongue 1 to which it is secured by a pivot at 16. It extends across the straddle bar 14 and is secured thereto by a pivot at 17 and it will be seen that by means of this lever the operator can vary the angle of the vertical plane of the axle B to the lines of draft, and also vary the positions of the wheels E in relation thereto. When the lever is in the central position, as shown in Fig. 1, the parts are so adjusted that the lines of travel of the wheels are parallel to the lines of draft. When the rear end of the lever is thrown to the right, as shown in Fig. 2 the forward part of the wheel frame is thrown to the right and the wheels are put at an angle to the lines of draft, the whole wheel frame being turned about the pivot 3ª. By these devices the operator can accurately steer the working parts of the machine in whatever direction he desires. The manner in which the frame 9, 9, 10 and the frame C are shifted transversely relatively to the tongue or draft frame, will be clear from a comparison of the positions of these frames shown in Fig. 2 with the positions shown in Fig. 1.

To steady frame 9, 9, 10 and hold it firm in relation to the tongue at its front end in whatsoever position, transversely, it may be put, use is made of a bar 9ª riding in a guide or stirrup 1ª secured to the under side of the tongue and having an anti-friction roller upon which the lower side of bar 9ª rides (Fig. 5).

18 designates a series of rack teeth formed on the upper cross bar of the frame-like casting 3. This rack 18 being held rigid in relation to the tongue, furnishes the means for locking the frames and the draft devices in any desired position. With the rack 18 engages a detent on the under side of the lever 15 controlled by the thumb-piece or hand-latch 19.

Under some circumstances it is desirable to allow the operator to use his feet in effecting these adjustments in the position of the frame parts of the machine together with the axle and the wheels. 20, 20 are foot-levers having their stirrup parts situated so that they can be reached by the feet of the driver. Each is pivoted at 21 to bracket 24 secured to the frame 9. The upper ends of the levers are connected by links 22 to a cross-head 23. This is rigidly secured to a spider or cross 23ª and 23ᵇ is a bar also rigidly connected to the cross 23ª and pivoted at 23ᶜ to the casting 3. The cross-head 23 is slidably connected to the lever 15 by means of the block 15ª which is mounted between the bar 23ᵇ and the cross-head 23 on the pivot pin 23ᵈ. This block has a rectangular passage, in which the lever 15 is slidably mounted. If the operator presses his foot upon the right hand lever 20, he draws back upon the link 22 and upon the right hand end of the cross-head 23, so as to swing it to the right about the pivot 23ᶜ, which results in moving the forward end of the frame 9, 9, 10 toward the right. By pressing his foot against the stirrup 20 on the left side, the parts will be moved in the opposite direction. When the foot-system of levers is to be used, the detent engaging with the rack 18 should be withdrawn and can be held out of engagement with the rack by means of the stop loop 19ª which can be thrown out so as to hold the thumb-latch in inoperative position.

The drag-bars for drawing the cultivator gangs are indicated by 27. They are curved inwardly at their forward ends and are flexibly connected to the frame 9, 9, 10 preferably by ball and socket joints as shown at 28.

In the drawings, I have shown concavo-convex disks as the devices for acting on the ground, but it will be understood that many of the structural features characterizing the present invention can be employed when use is made of other forms of earth tool. The specific form of tool gang shown in the drawings constitutes the subject matter of my Patent No. 1,054,404, issued February 25, 1913, upon my application, Ser. No. 482,311, filed March 9, 1909, which application is a division of the present application. As, therefore, the specific form of the tool gang is not claimed in this application, a detailed description thereof will not here be given. Suffice it to state that each gang comprises a frame or tool carrier, designated as an entirety by 35, which is rigidly secured to the lower rear end of one of the drag bars 27, and this frame carries a series of disks 40, 40. The gang frame is constructed so that the series of disks may be adjusted universally, that is, about axes at right angles to each other, as set forth in the divisional application above referred to.

The two gangs are connected by a bar 43, which is arched centrally to pass over the plants of a row, and has its ends extending laterally and horizontally. To these horizontally extending end sections of the bar, the gang frames are adjustably secured by means of clamps 44.

Each gang frame carries an adjustably mounted foot bar 89 having a stirrup 90 and by means of these the operator can, to some extent, control the position of the gangs.

Each gang can be vertically adjusted as follows: 95 is a rod which extends upward from and is flexibly secured at 96 to the parts which hold the gang. With this lifting rod 95 there is combined a lever 97, pivoted at 98 to a bracket 103 rising from the frame. At 99 the lever is forked, the ends of the fork straddling the lifting head and being pivotally connected to a block 100 which is loosely fitted to and adapted to slide along the rod 95. 101ª is a stop at the upper end of the rod against which the spring 101 bears.

102 is a coiled spring mounted on the lower part of the rod and adapted to bear downward on the disk gang.

The bracket 103 is provided with a toothed locking segment at 104 with which a detent carried by the lever 97 is adapted to engage so as to hold the lever and the gangs in any desired position. 105 is a spring which is connected at one end to the lever and at the other to a hooked projection 103ª carried by the bracket 103. As the hand lever is raised or lowered, the tension of the spring 105 tends to pull it down or up, according as the upper end of the spring is below or above a line through the pivot 98 and the lower, stationary end of the spring. The parts are so disposed in relation to each other, that the lever is in the neutral position when the lower edges of the tools are about at the surface of the earth, and thus the spring assists both the downward movement of the lever to lift the tools and its upper movement to force the tools into the earth.

The seat at 106 is supported on the frame D, the latter having diverging bars 107 which are secured to 108 to the frame and which may also be attached at 109 as shown.

I am aware that it has heretofore been proposed to provide in cultivators a wheel frame which is pivotally connected with a draft frame so as to be turned to effect steering. And I am also aware that in other cultivators it has been proposed to fixedly pivot the tool-carrying frame in such a way that it can be swung laterally to follow to a certain extent the irregularities of the rows. But I believe myself to have been the first to provide a pivotal connection (or two closely adjacent pivotal connections) for the cultivator frame near the normal center of the machine and to provide means whereby this normally central pivotal connection can be moved laterally. The two tool gangs are held spaced apart by means of the bar 43 to operate on the two sides of a plant row and they are held equally distant from the centrally located draft point by means of the bars 27, 27. This normally rigid tool frame therefore holds the tools always in fixed relationship to each other and to the plant row when the front end of the tool frame is properly guided. It is impossible for the distance between the tool gangs to vary and it is impossible for one gang to get ahead of the other so as to cause the gangs to act successively instead of simultaneously on the plants. And in this respect a cultivator embodying my invention is to be contrasted with earlier proposed cultivators in which, instead of a rigid tool frame drawn from a central pivot point, there were provided two separate independently movable draft frames drawn from pivotal points widely separated transversely. And I also believe myself to have been the first to combine three frames in the manner described, that is, with the wheel frame and the draft frame pivotally connected at a relatively rearward point, and with the tool frame and the wheel frame pivotally connected at a relatively forward point. This arrangement of the pivot points enables the wheel frame to be turned to steer the cultivator to the right or to the left, and the same movement of the wheel frame also moves the tool frame to cause it to follow the row. The tool frame, being rigid, serves, as before stated, to hold the two tool gangs in fixed relationship to each other and to the plant rows.

What I claim is:

1. In a cultivator, the combination of the wheels, the arched wheel frame, the draft frame, the two tool gangs, the two drag bars extending from the central longitudinal-vertical planes of the machine outward, downward and backward and having their front ends arranged to swing laterally of the machine independently of the draft frame, the tool gangs secured to the lower rear ends of the drag bars, an intermediate frame rigid with the arched frame and pivotally connected near the arched frame to the draft frame and extending forward from the pivotal connection to the centrally arranged front ends of the drag bars, means for laterally moving the front ends of the drag bars and of the intermediate frame independently of the draft frame, and a sliding guide and bracing mechanism in transverse vertical planes between the aforesaid pivotal connection and the front ends of the drag bars.

2. The combination of the wheel frame, the draft frame, means pivotally connecting the wheel frame and the draft frame, the tool supporting devices, the hand lever adapted to swing the wheel frame relative to the draft frame, the foot lever carried by the wheel frame, and a connection between the foot lever carried by the wheel frame, and the hand lever comprising a lever fulcrumed on one of the said frames whereby the latter may be actuated by the foot lever to swing the wheel frame relative to the draft frame, substantially as set forth.

3. The combination of the wheel frame, the draft frame, means pivotally connecting the wheel frame and the draft frame, the tool supporting devices, the hand lever adapted to swing the wheel frame relative to the draft frame, foot levers carried by the wheel frame and connections between said foot levers and the hand lever comprising a lever fulcrumed on one of the said frames whereby the latter can be moved in one direction by one foot lever and in the other direction by the other foot lever to cause the swinging of the wheel frame relative to the draft frame, substantially as set forth.

4. The combination of the draft frame, the wheels, the wheel frame, means pivotally connecting the wheel frame and the draft frame, the tool gangs, the drag bars extending from the tool gangs forward and upward and having their front ends pivotally connected to a carrier rigid with the wheel frame independently of the draft frame, a foot lever system adapted to adjust the drag bars and tool gangs independently of the draft frame, and a hand lever system interconnected with the foot lever system and adapted to similarly adjust the drag bars and gangs, said lever systems being optionally usable alternately or simultaneously, substantially as set forth.

5. The combination of the draft frame, the wheels, the wheel frame, means pivotally connecting the wheel frame and the draft frame, the tool gangs, the drag bars extending forward and upward from the tool gangs and having their front ends pivotally attached to a carrier rigid with the wheel frame independently of the draft frame, a foot lever system and a hand lever system interconnected with each other and both adapted to move the front ends of the drag bars and the wheel frame laterally, and means for locking both of the lever systems in different angular positions.

In testimony whereof I affix my signature, in presence of two witnesses.

CHARLS P. A. FRIBERG.

Witnesses:
BAILEY W. AVERY,
OTTO A. TREFZ.